US011822226B2

(12) United States Patent
Mistkawi

(10) Patent No.: US 11,822,226 B2
(45) Date of Patent: Nov. 21, 2023

(54) BRAKING SYSTEMS FOR ACTUATOR SHAFTS

(71) Applicant: Datalogic USA, Inc., Eugene, OR (US)

(72) Inventor: Joseph Mistkawi, Bologna (IT)

(73) Assignee: Datalogic USA, Inc., Eugene, OR (US)

( * ) Notice: Subject to any disclaimer, the term of this patent is extended or adjusted under 35 U.S.C. 154(b) by 1276 days.

(21) Appl. No.: 16/257,286

(22) Filed: Jan. 25, 2019

(65) Prior Publication Data

US 2020/0241386 A1 Jul. 30, 2020

(51) Int. Cl.
*G03B 3/10* (2021.01)
*H02K 7/102* (2006.01)
*H02K 41/03* (2006.01)
*H02K 7/106* (2006.01)

(52) U.S. Cl.
CPC .............. *G03B 3/10* (2013.01); *H02K 7/106* (2013.01); *H02K 7/1023* (2013.01); *H02K 41/031* (2013.01)

(58) Field of Classification Search
CPC .......... G02B 7/005; G02B 7/04; G02B 27/62; G02B 27/646; G03B 3/10; G03B 5/00; G03B 2205/0069; H02K 7/1023; H02K 7/106; H02K 41/02; H02K 41/031
See application file for complete search history.

(56) References Cited

U.S. PATENT DOCUMENTS 6,446,769 B1 * 9/2002 Kangiser ................ H02K 41/02
188/67
9,134,503 B2 9/2015 Topliss 2008/0197949 A1 * 8/2008 Lurquin ................. G02B 7/102
335/229
2015/0077852 A1 * 3/2015 Lam ......................... G02B 7/04
359/557
2015/0316743 A1 * 11/2015 Lewkow .................. G02B 7/10
359/823

OTHER PUBLICATIONS

Apex Industrial Supply, "What are Ball Plungers used for?" Oct. 15, 2018, https://apexindustrialsupply.com/blog/what-are-ball-plungers-used-for/, accessed Mar. 23, 2023 (Year: 2018).*
JP-2002340058-A (Year: 2002).*

* cited by examiner

*Primary Examiner* — Tulsidas C Patel
*Assistant Examiner* — Joshua Kiel M Rodriguez
(74) *Attorney, Agent, or Firm* — SHOOK, HARDY & BACON, LLP

(57) ABSTRACT

An electromagnetic braking assembly for maintaining an actuator shaft in position, and methods for utilizing the same, are provided. The actuator shaft may include an object, e.g., an imaging lens, which is movable in accordance with movement of the shaft. The braking assembly may include a braking coil to which electricity may be applied to produce a magnetic field, a braking magnet capable of changing position as it interacts with the magnetic field, and a braking spring coupled with the magnet such that the spring changes position as the magnet changes position. When the braking spring is in one position, the spring exerts pressure on the actuator shaft substantially preventing the shaft from engaging in linear movement and thus maintaining the shaft in position. When the actuator shaft is in another position, the braking spring does not exert pressure on the shaft permitting the shaft to engage in linear movement.

20 Claims, 9 Drawing Sheets

BRAKING SYSTEMS FOR ACTUATOR SHAFTS

BACKGROUND

In imaging assemblies, for instance, in cameras incorporated into other useful devices such as optical scanners (e.g., barcode scanners) and mobile devices (e.g., cellular telephones and/or personal digital assistances), focus of the lens of the image assembly is crucial for achieving optimal image quality. Typically, the lens is movable via interaction with an actuator shaft to attain and/or maintain such focus. The actuator shaft generally employs an electromagnetic movement system wherein an actuator coil is energized to create a magnetic field and an actuator magnet interacts with the magnetic field causing the actuator shaft to move in a direction that is dependent on the polarity of the current utilized to energize the coil and to a degree determined by the magnitude of the current. Once the actuator shaft is in the desired position (that is, the position that causes the lens to be in the position required for optimal focus), current must continue to be applied to the actuator coil to maintain such position. That is, if energizing of the actuator coil were to cease, the actuator shaft would be free to engage in lateral movement in two opposing directions and the position of the lens of the imaging assembly would be compromised. Maintaining the actuator coil in an energized state, however, requires power consumption which may be undesirable, for instance, in mobile devices where such power consumption causes the mobile device battery to be drained.

In other imaging assemblies, power consumption may not be a concern, for instance, in large-scale imaging assemblies that may be plugged into a continuous power supply. In such assemblies, however, maintenance of the position of the lens of the imaging assembly is still of importance. Many such assemblies may be subjected to vibration, expansion and/or contraction due to thermal changes, and the like, conditions which can cause the focus of the lens of the imaging assembly to become compromised.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems and methods are provided for an electromagnetic braking assembly that is usable to maintain an actuator shaft in position. The actuator shaft may include an object, for instance, an optical element such as an imaging lens, which is movable in accordance with movement of the actuator shaft. As such, embodiments hereof may be usable in imaging applications, for instance, for autofocusing (or manually focusing) a camera. In embodiments, the braking assembly includes a braking coil to which electricity may be applied to produce a magnetic field, a braking magnet that is capable of changing position as it interacts with the magnetic field, and a braking spring coupled with the braking magnet such that the braking spring changes position as the braking magnet changes position. When the braking spring is in a first position, the braking spring exerts pressure on the actuator shaft substantially preventing the actuator shaft from engaging in linear movement and thus maintaining the actuator shaft in position. When the actuator shaft is in a second position, the braking spring does not exert pressure on the actuator shaft permitting the actuator shaft to engage in linear movement in at least two opposing directions.

Embodiments hereof allow an actuator shaft to maintain its position even when electricity ceases to be applied to an actuator coil. This, in turn, permits substantial power savings that can be useful in, for instance, mobile device imaging systems. Embodiments hereof further allow an actuator shaft to exert a force upon an object (for instance, a lens barrel assembly) to aid in maintaining a relative position of the object during conditions such as vibration, thermal expansion and contraction, and the like.

BRIEF DESCRIPTION OF THE DRAWINGS

The present disclosure is illustrated by way of example and not limitation in the accompanying figures in which like reference numerals indicate similar elements and in which.

DETAILED DESCRIPTION

Figure 1:
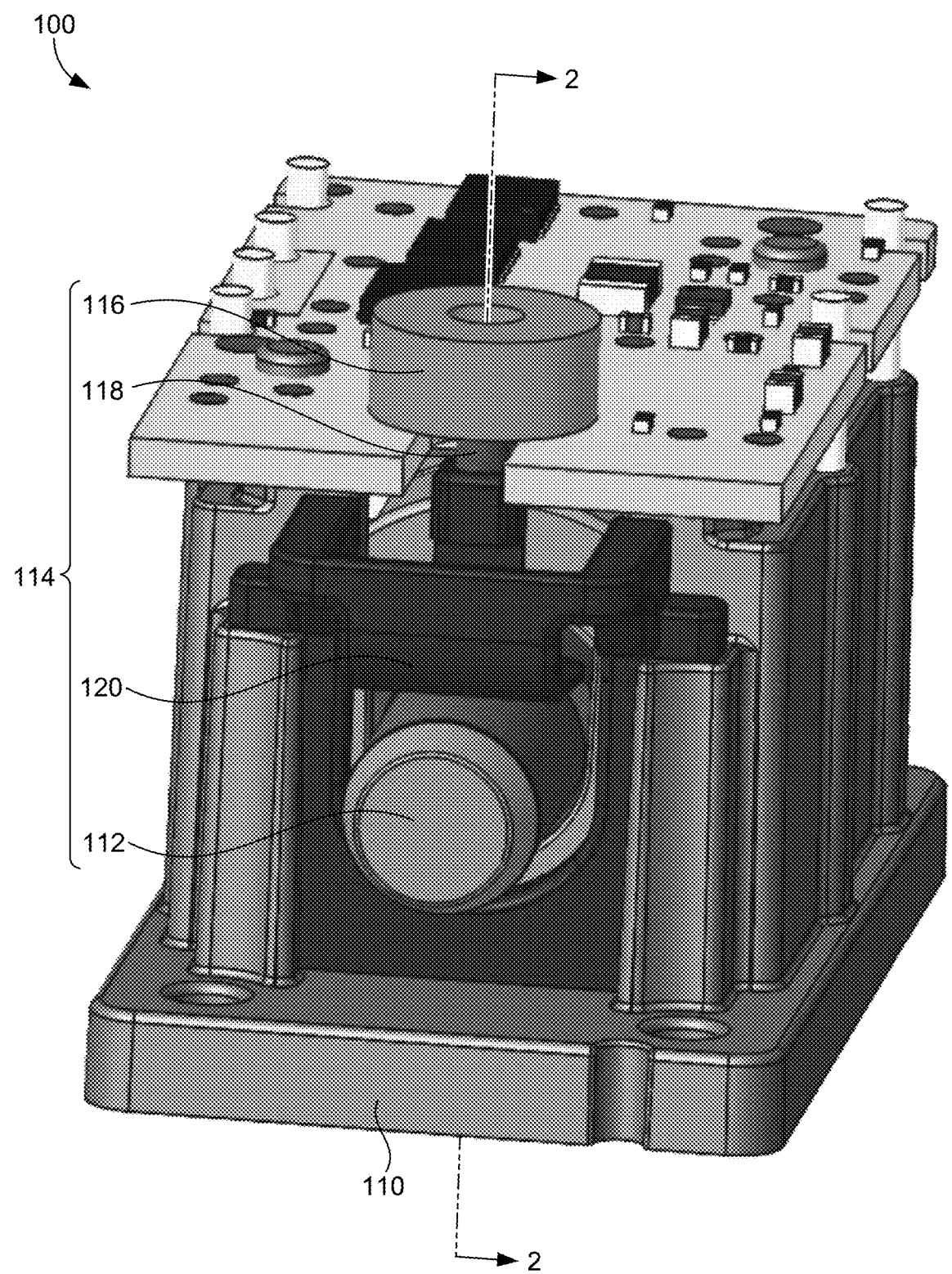
FIG. 1 is a schematic diagram illustrating an electromagnetic actuator assembly, in accordance with embodiments of the present disclosure.

The subject matter of the present disclosure is described with specificity herein to meet statutory requirements. However, the description itself is not intended to limit the scope of this patent. Rather, the inventor has contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously set forth, in imaging assemblies, for instance, cameras incorporated into optical scanners (e.g., barcode scanners) or mobile devices (e.g., cellular telephones and/or personal digital assistances), focus of the lens of the imaging assembly is key to achieving optimal image quality. In many instances, the lens may be movable via interaction with an actuator shaft to attain and/or maintain such focus. In some such instances, the actuator shaft employs an electromagnetic movement system having an actuator coil that is energized to create a magnetic field and an actuator magnet that interacts with the magnetic field that causes the actuator shaft to move in a direction that is dependent on the polarity of the current utilized to energize the coil. The degree of movement may be determined by the magnitude of the current. Once the actuator shaft is in the desired position (that is, the position that causes the lens to be in the position required for optimal focus), current must continue to be applied to the actuator coil to maintain such position. That is, if energizing of the actuator coil were to cease, the actuator shaft would be free to engage in lateral movement in two opposing directions and the position of the lens of the imaging assembly would be compromised. Maintaining the actuator coil in an energized state, however, requires power consumption which may be undesirable, for instance, in mobile devices where such power consumption causes the mobile device battery to be drained.

In other imaging assemblies, power consumption may not be a concern, for instance, in large-scale imaging assemblies that may be plugged into a continuous power supply. In such assemblies, however, maintenance of the position of the lens of the imaging assembly is still of importance. Many such assemblies may be subjected to vibration, expansion and/or contraction due to thermal changes, and the like, conditions which can cause the focus of the lens of the imaging assembly to become compromised.

To alleviate such concerns with current imaging assemblies, electromagnetic braking assemblies are described herein that are usable to maintain an actuator shaft in position. The actuator shaft itself may be electromagnetic or it may be formed of another material (e.g., stainless steel) and have a magnet disposed at one terminus thereof. The actuator shaft may include an object, for instance, an optical element such as an imaging lens, which is movable in accordance with movement of the actuator shaft. As such, embodiments hereof may be usable in imaging applications, for instance, for autofocusing (or manually focusing) a camera. In embodiments, the braking assembly includes a braking coil to which electricity may be applied to produce a magnetic field, a braking magnet that is capable of changing position as it interacts with the magnetic field, and a braking spring coupled with the braking magnet such that the braking spring changes position as the braking magnet changes position. When the braking spring is in a first position, the braking spring exerts pressure on the actuator shaft substantially preventing the actuator shaft from engaging in linear movement and thus maintaining the actuator shaft in position. When the actuator shaft is in a second position, the braking spring does not exert pressure on the actuator shaft permitting the actuator shaft to engage in linear movement in at least two opposing directions.

Embodiments hereof allow an actuator shaft to maintain its position even when electricity (current) ceases to be applied to an actuator coil. This, in turn, permits substantial power savings that can be useful in, for instance, mobile device imaging systems. Embodiments hereof further allow an actuator shaft to exert a force upon an object (for instance, a lens barrel assembly) to aid in maintaining a relative position of the object during conditions such as vibration, thermal expansion and contraction, and the like.

Accordingly, exemplary embodiments are directed to an electromagnetic braking assembly that includes a braking coil, a braking magnet and a braking spring. The braking coil is configured to receive a first current applied thereto and to produce a first magnetic field during application of the first current. The braking magnet is configured to move from a first position to a second position responsive to interaction with the first magnetic field. The braking spring is coupled with the braking magnet such that when the braking magnet is in the first position, the braking spring exerts pressure on an electromagnetic actuator shaft and when the braking magnet is in the second position, the braking spring does not exert pressure on the electromagnetic actuator shaft.

Other exemplary embodiments are directed to a method for utilizing an electromagnetic braking assembly configured to maintain an electromagnetic actuator shaft in position. The electromagnetic braking assembly includes a braking coil, a braking magnet and a braking spring coupled with the braking magnet. The method includes applying a current of a first polarity to the braking coil such that a first magnetic field is produced which causes the braking magnet to move from a first position to a second position responsive to interaction with the first magnetic field. When the braking magnet is in the first position, the braking spring exerts pressure on the electromagnetic actuator shaft substantially preventing linear movement of the electromagnetic actuator shaft. When the braking magnet is in the second position, the braking spring does not exert pressure on the electromagnetic actuator shaft and the electromagnetic actuator shaft is capable of engaging in linear movement.

Still other exemplary embodiments are directed to an actuator coil assembly that includes an electromagnetic actuator shaft, an actuator coil and an electromagnetic braking assembly. The electromagnetic actuator shaft is configured to engage in linear movement in two opposing directions. The actuator coil is concentric with and surrounds the electromagnetic actuator shaft and is configured to receive a first current applied thereto and to produce a first magnetic field during application of the first current. The electromagnetic braking assembly includes a braking coil configured to receive a second current applied thereto and to produce a second magnetic field during application of the second current, a braking magnet configured to move from a first position to a second position responsive to interaction with the second magnetic field, and a braking spring coupled with the braking magnet. When the braking magnet is in the first position, the braking spring exerts pressure on the electromagnetic actuator shaft. When the braking magnet is in the second position, the braking spring does not exert pressure on the electromagnetic actuator shaft.

Still further, exemplary embodiments are directed to a method for utilizing an electromagnetic braking assembly configured to maintain an electromagnetic actuator shaft of an actuator coil assembly in position. The actuator coil assembly includes the electromagnetic actuator shaft and an actuator coil concentric with and surrounding the electromagnetic actuator shaft. The electromagnetic braking assembly includes a braking coil, a braking magnet and a braking spring coupled with the braking magnet. The method includes: (1) applying a first current to the actuator coil such that a first magnetic field is produced; (2) applying a second current having a first polarity to the braking coil such that a second magnetic field is produced, wherein, responsive to the braking magnet interacting with the second magnetic field, the braking magnet is caused to move from a first position whereby the braking spring exerts pressure on the electromagnetic actuator shaft substantially preventing linear movement of the electromagnetic actuator shaft to a second position whereby the braking spring does not exert pressure on the electromagnetic actuator shaft permitting the linear movement of the electromagnetic actuator shaft; (3) facilitating the linear movement of the electromagnetic actuator shaft from a starting position to an ending position via interaction of the electromagnetic actuator shaft with the first magnetic field; and (4) ceasing application of the second current to the braking coil such that production of the second magnetic field ceases.

Additional embodiments are directed to an electromagnetic braking system for an optical lens barrel assembly. The electromagnetic braking system includes a braking system chassis having a first cylindrical opening through at least a portion thereof, the cylindrical opening having an interior wall. The electromagnetic braking system further includes a cylindrical braking coil positioned on at least a portion of the interior wall of the cylindrical opening such that the cylindrical braking coil has a second cylindrical opening through at least a portion thereof. Still further, the electromagnetic braking system includes an actuator shaft having a first end and a second end, the first end being configured to be received within an opening in a housing for the optical lens barrel assembly and to exert pressure on the optical lens barrel assembly, and the second end having a spring and a braking magnet coupled therewith. The second end of the actuator shaft is configured for being received within at least a portion of the cylindrical opening through the cylindrical braking coil, wherein responsive to application of a first current to the cylindrical braking coil, a first magnetic field is produced, and wherein responsive to interaction of the braking magnet with the first magnetic field, the actuator shaft is caused to engage in linear movement from a first position whereby the first end exerts pressure on the lens barrel assembly to a second position whereby the first end ceases to exert pressure on the lens barrel assembly.

Turning now to FIG. 1, illustrated is a schematic diagram of an electromagnetic actuator assembly 100, in accordance with embodiments of the present disclosure. The electromagnetic actuator assembly 100 includes an actuator chassis 110, an actuator shaft 112 (in this instance an electromagnetic actuator shaft) and a braking assembly 114. The braking assembly includes a braking coil 116, a braking magnet 118 and a braking spring 120. It should be understood that this and other arrangements described herein are set forth only as examples. Other arrangements and elements can be used in addition to or instead of those shown, and some elements may be omitted altogether.

Figure 2A:
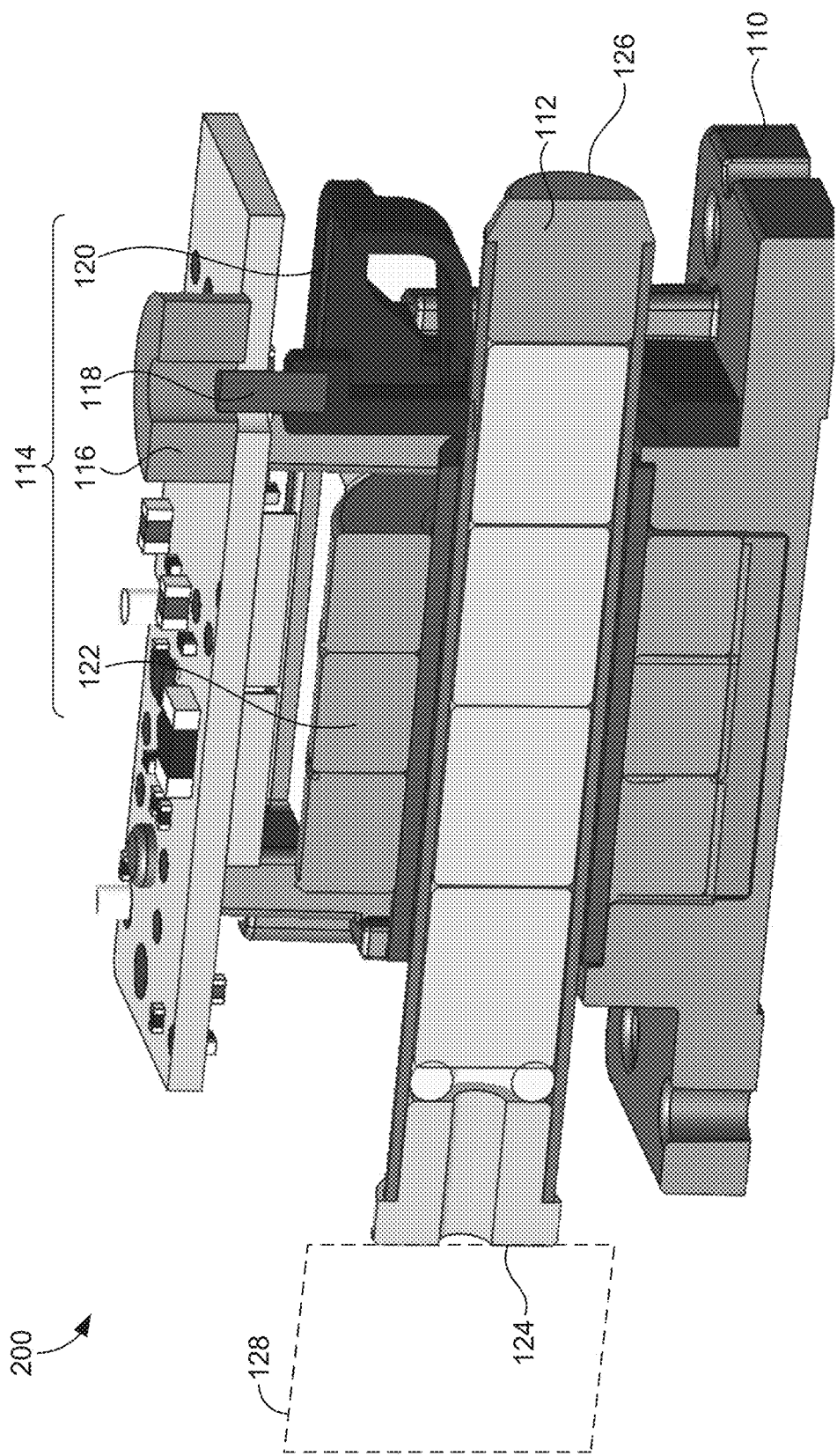
FIG. 2A is a schematic diagram illustrating a section view of the electromagnetic actuator assembly of FIG. 1 cut along the line labeled 2-2, the braking assembly thereof exerting pressure on an actuator shaft, in accordance with embodiments of the present disclosure.

Placement and interaction of many of the elements of FIG. 1 are better viewed with reference to FIG. 2, wherein a schematic diagram is shown illustrating a section view 200 of the electromagnetic actuator assembly 100 of FIG. 1 cut along the line labeled 2-2, in accordance with embodiments of the present disclosure. As shown, the braking coil 116 is concentric with and surrounds at least a portion of the braking magnet 118. The braking spring 120 may be coupled with the braking magnet 118 such that movement of the braking magnet 118 translates into movement of the braking spring 120 as well. Such movement of the braking magnet 118 may be caused by application of a current to the braking coil 116 producing a magnetic field (not shown) with which the braking magnet 118 interacts. Application of current to electromagnetic actuator assemblies is well known to those having ordinary skill in the art and, accordingly, such functionality is neither further described nor illustrated herein.

FIG. 2 also illustrates an actuator coil 122 that is concentric with and surrounds at least a portion of the electromagnetic actuator shaft 112. The actuator coil 122 may be configured to receive a current applied thereto and, responsive thereto, produce a magnetic field (not shown) with which the electromagnetic actuator shaft 112 may interact resulting in movement thereof.

The electromagnetic actuator shaft 112 includes a first terminus 124 and a second terminus 126. In embodiments, an object 128 may be coupled with the first terminus 124 such that movement of the electromagnetic actuator shaft 112 similarly results in movement of the object 128. In embodiments, the object 128 may be an optical element, for instance, an imaging lens.

Figure 2B:
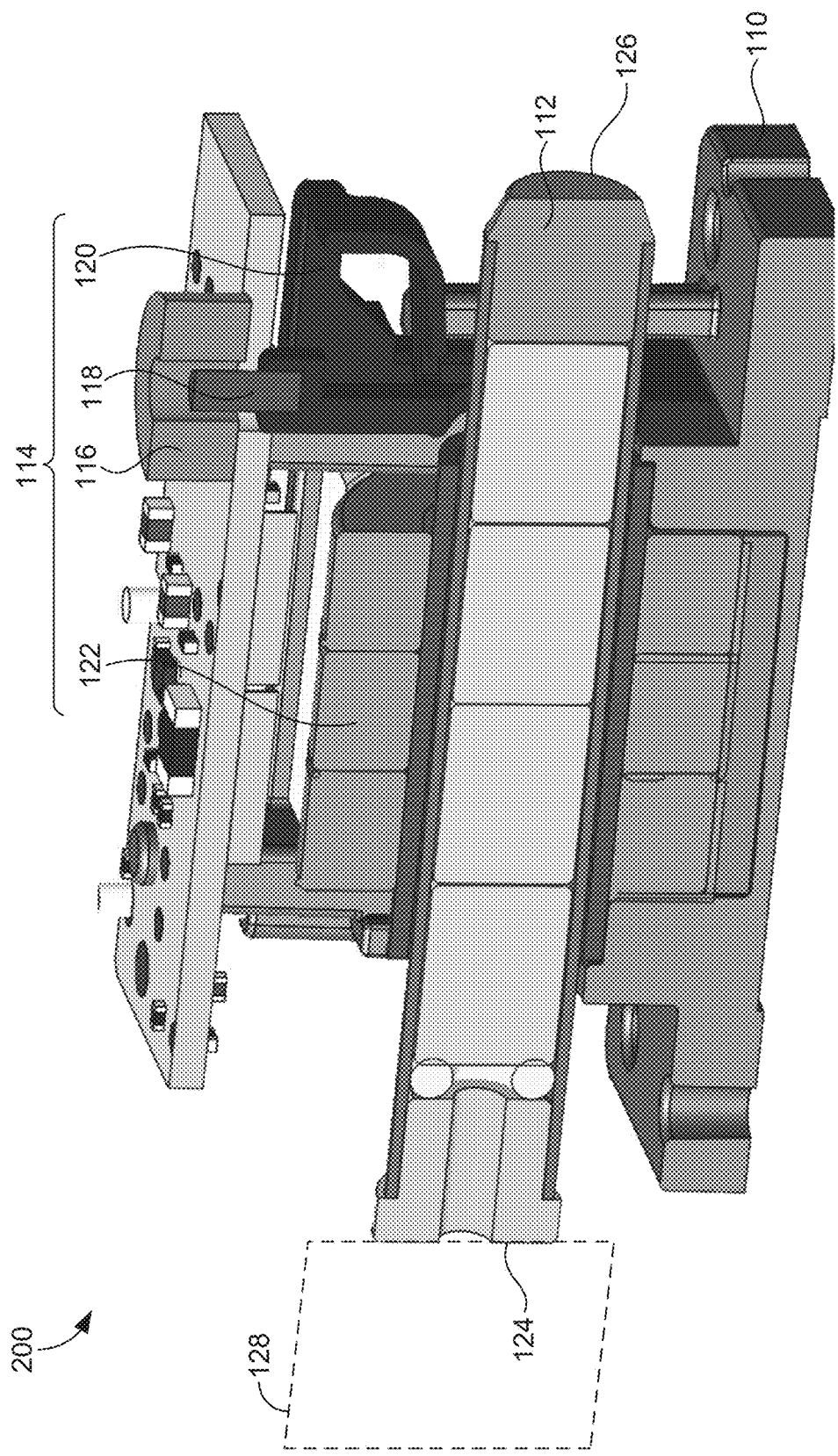
FIG. 2B is a schematic diagram illustrating a section view of the electromagnetic actuator assembly of FIG. 1 cut along the line labeled 2-2, the braking assembly thereof not exerting pressure on an actuator shaft, in accordance with embodiments of the present disclosure.

In operation, a first current may be applied to the actuator coil 122 resulting in production of a first magnetic field (not shown). A second current may be applied to the braking coil 116 resulting in production of second magnetic field (not shown). Responsive to the second magnetic field, the braking magnet 118 may change its position from a first position in which the braking spring 120 coupled therewith is exerting pressure on the actuator shaft 112 (FIG. 2A) and a second position in which the braking spring 120 coupled therewith is not exerting pressure on the actuator shaft 112 (FIG. 2B). When the braking spring 120 is exerting pressure on the actuator shaft 112 (FIG. 2), the actuator shaft 112 is substantially prevented from engaging in linear movement. When the braking spring 120 is not exerting pressure on the actuator shaft 112 (FIG. 2B), the actuator shaft 112 is capable of engaging in linear movement in two opposing directions. In this instance, movement of the actuator shaft 112 may be caused by interaction of the electromagnetic actuator shaft 112 with the first magnetic field (not shown).

When it is desirable to move the actuator shaft (for instance, when it is desirable to move an optical element coupled with the first terminus 124 of the electromagnetic actuator shaft 112 to obtain optimal focus), current may be applied to the actuator coil 122 and the braking coil 116 such that the braking spring 120 is moved to the second position wherein pressure is not exerted on the actuator shaft 112 and the actuator shaft 112 is caused to move to the desired position. When it is desirable that the actuator shaft maintain its position (for instance, when optimal focus of an optical element coupled with the first terminus 124 of the electromagnetic actuator shaft 112 is already attained), current may be discontinued from the actuator coil 122 and from the braking coil 116. In embodiments, such will permit the braking spring 120 may be permitted to return to the second position wherein pressure is being exerted on the actuator shaft 112. In embodiments, current may be discontinued from the actuator coil 112 but maintained with respect to the braking coil 116. In such embodiments, the polarity of the current applied to the braking coil may be changed so as to cause movement of the braking spring 120 back to the first position wherein pressure is exerted upon the actuator shaft 112.

Figure 3:
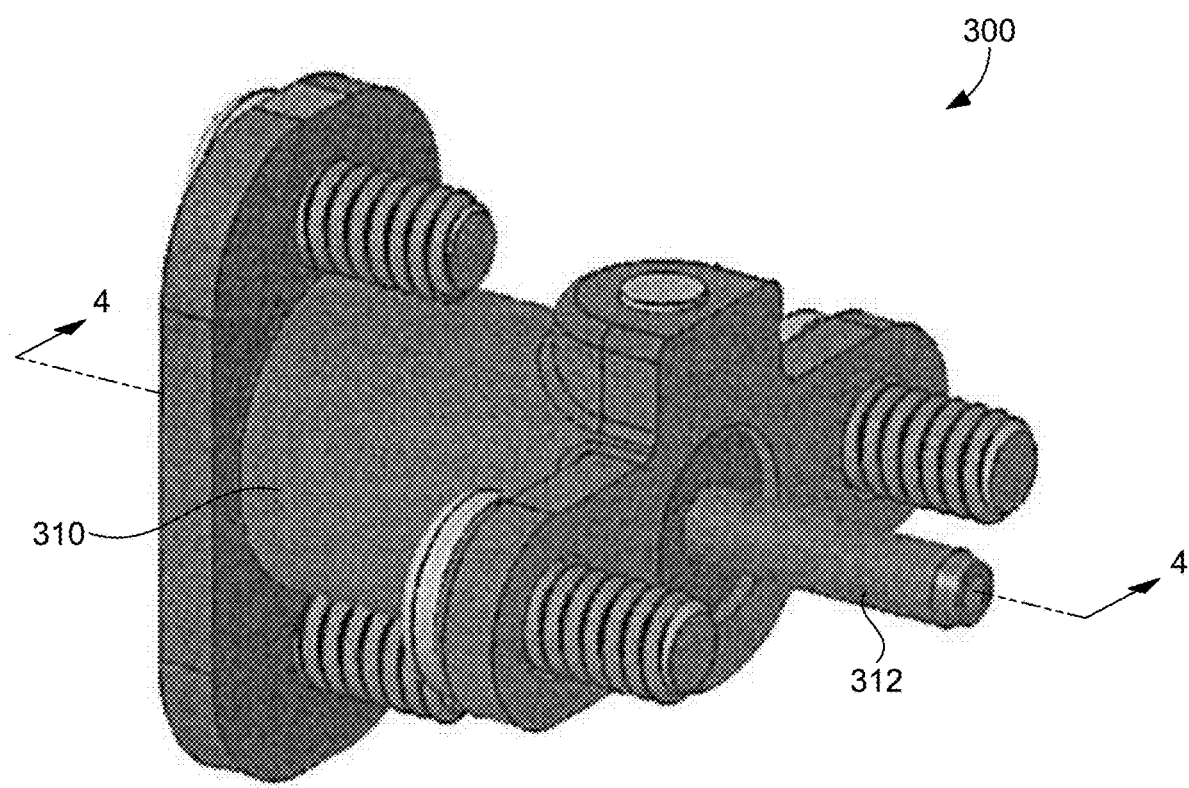
FIG. 3 is a schematic diagram illustrating a perspective view of an electromagnetic braking assembly, in accordance with embodiments of the present disclosure.

Turning now to FIG. 3, a schematic diagram is shown illustrating a perspective view of another embodiment of an electromagnetic braking assembly 300, in accordance with embodiments of the present disclosure. Embodiments such as the electromagnetic braking assembly 300 illustrated in FIG. 3 may be useful for industrial-type situations or any situation wherein a lens assembly may be subjected to significant vibration, thermal expansion and/or contraction, and the like. The electromagnetic braking assembly 300 includes an actuator chassis 310 and an actuator shaft 312 (in this instance plunger-type shaft). It should be understood that this and other arrangements described herein are set forth only as examples. Other arrangements and elements can be used in addition to or instead of those shown, and some elements may be omitted altogether.

Figure 4:
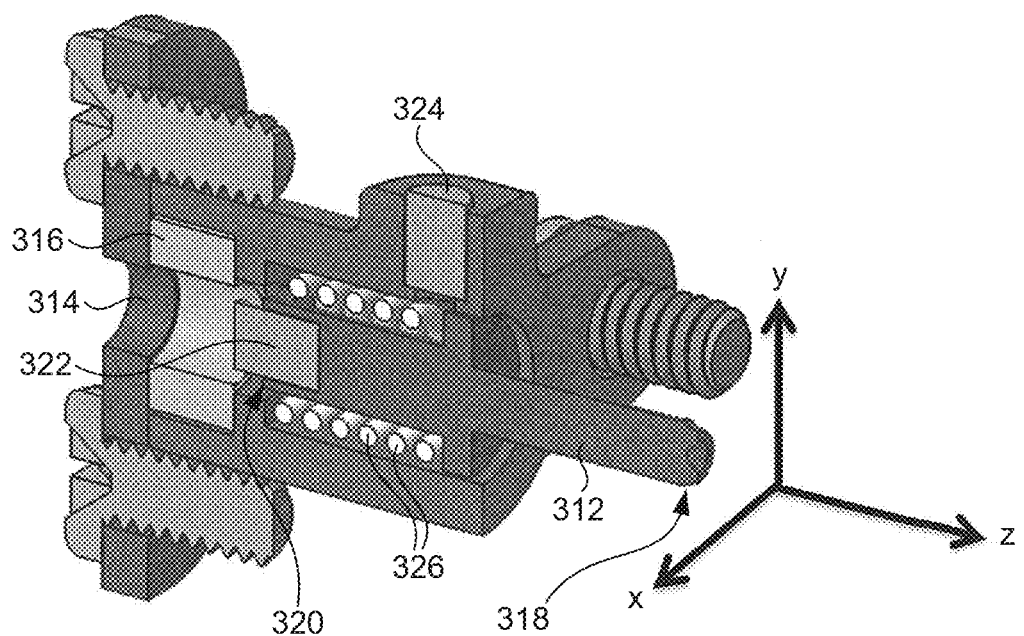
FIG. 4 is a schematic diagram illustrating a section view of the electromagnetic braking assembly of FIG. 3 cut along the line labeled 4-4, in accordance with embodiments of the present disclosure.

Placement and interaction of many of the elements of FIG. 3 are better viewed with reference to FIG. 4, wherein a schematic diagram is shown illustrating a section view of the electromagnetic braking assembly 300 of FIG. 3 cut along the line labeled 4-4, in accordance with embodiments of the present disclosure. As can be seen, the braking system chassis 310 includes a cylindrical opening 314 through at least a portion thereof. The cylindrical opening 314 includes an interior wall, at least a portion of which has coupled therewith a cylindrical braking coil 316. The cylindrical braking coil 316 also includes a cylindrical opening through at least a portion thereof.

Figure 5A:
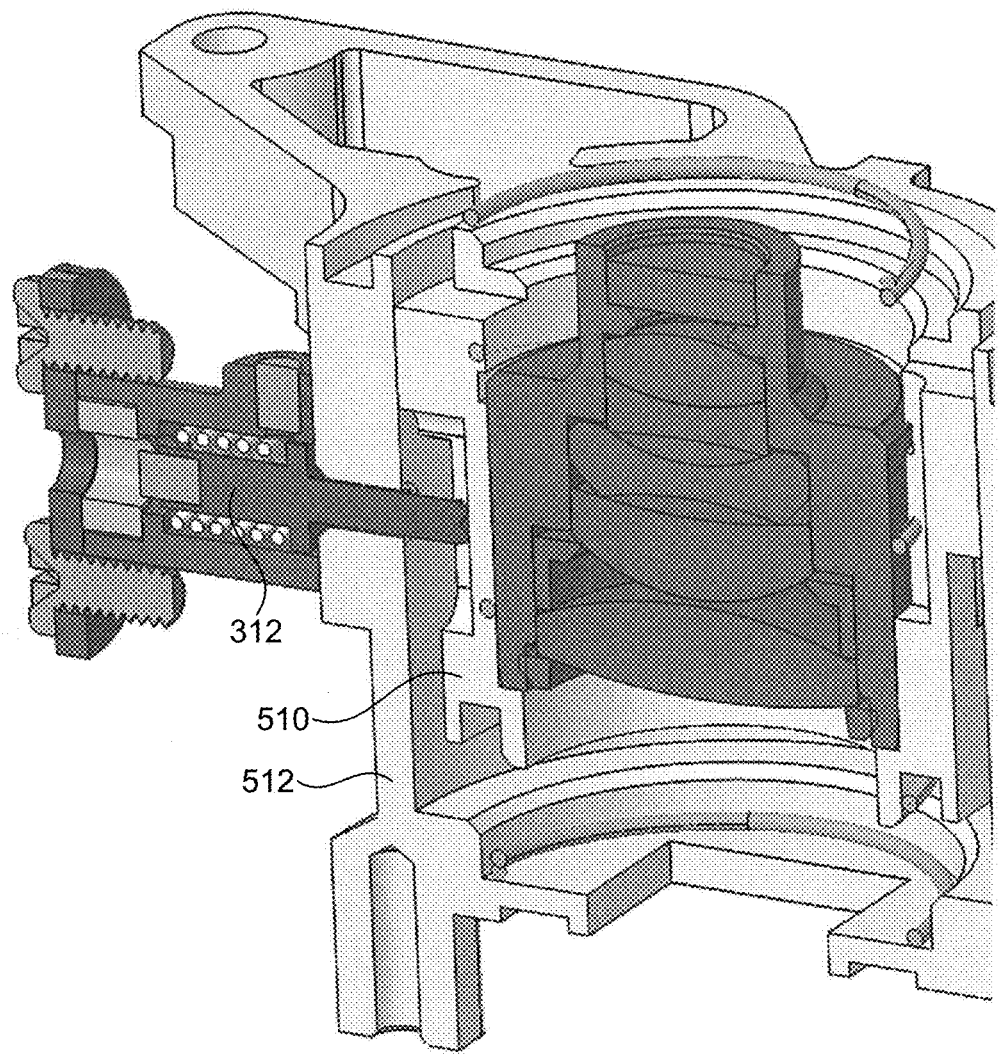
FIG. 5A is a schematic diagram illustrating a section view of an electromagnetic braking assembly engaged with an optical imaging assembly such that the actuator shaft of the braking assembly is exerting pressure on a lens barrel assembly, in accordance with embodiments of the present disclosure.
Figure 5B:
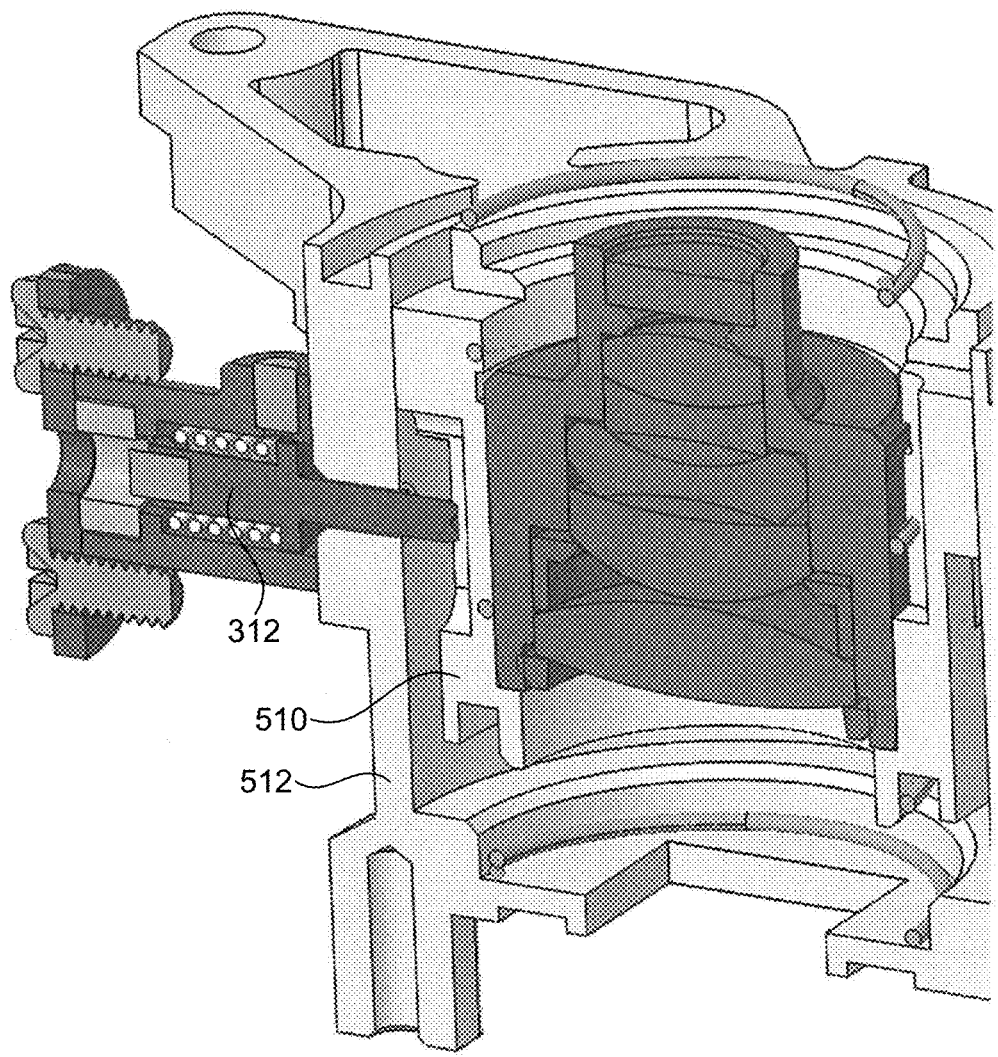
FIG. 5B is a schematic diagram illustrating a section view of an electromagnetic braking assembly engaged with an optical imaging assembly such that the actuator shaft of the braking assembly is not exerting pressure on a lens barrel assembly, in accordance with embodiments of the present disclosure.

The actuator shaft 312 includes a first end 318 and a second end 320. The first end 318 is configured to be received within an opening in a housing for an optical lens barrel assembly and to exert pressure on the optical lens barrel assembly, as more fully described below with reference to FIG. 5. The second end 320 includes a braking spring 326 and a braking magnet 322 coupled therewith. The second end 320 of the actuator shaft 312 is configured for being received within at least a portion of the cylindrical opening through the cylindrical braking coil 316. Responsive to application of a first current to the cylindrical braking coil 316, a first magnetic field (not shown) is produced. Responsive to interaction of the braking magnet 322 with the first magnetic field (not shown), the actuator shaft 312 is caused to engage in linear movement from a first position (shown by actuator shaft 512 in FIG. 5A) whereby the first end 318 exerts pressure on the lens barrel assembly 510 to a second position (shown by actuator shaft 512 in FIG. 5B) whereby the first end 318 ceases to exert pressure on the lens barrel assembly 510.

The electromagnetic braking system 300 of FIG. 4 further includes an alignment magnet 324 (may also be a ball screws spring) configured for exerting a force in a direction substantially perpendicular to a direction of the linear movement of the actuator shaft 312 causing at least a portion of the actuator shaft 312 to press against the interior wall of the cylindrical opening 314 of the braking system chassis 310. Such vertical pressing substantially prevents movement of the actuator shaft 312 in the vertical direction (that is, within the cylindrical opening 314 regardless of any linear movement in the horizontal direction).

Figure 6:
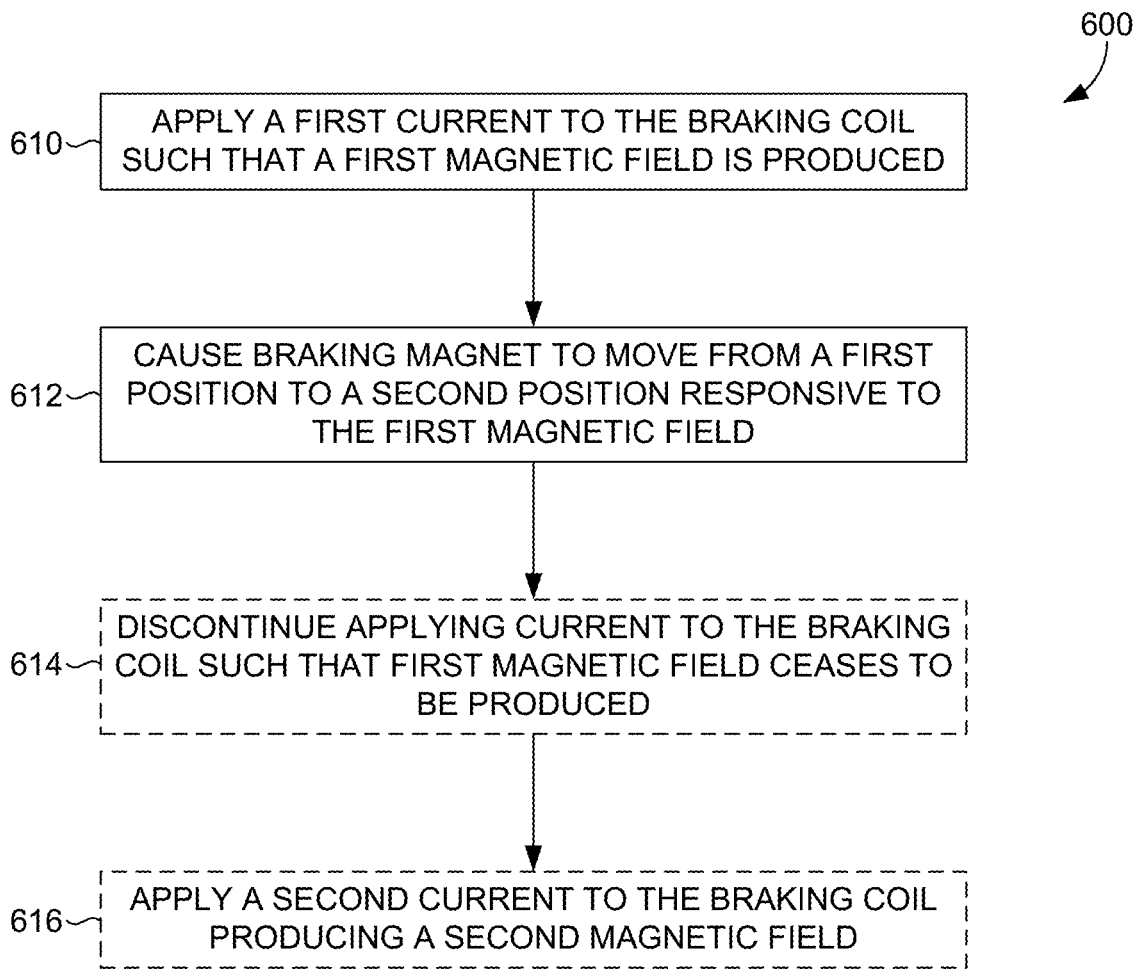
FIG. 6 is a flow diagram illustrating a method for utilizing an electromagnetic braking assembly to maintain an electromagnetic actuator shaft in position, in accordance with embodiments of the present disclosure.

With reference now to FIG. 6, a flow diagram is illustrated showing a method 600 for utilizing an electromagnetic braking assembly to maintain an electromagnetic actuator shaft in position, in accordance with embodiments of the present disclosure. The electromagnetic braking assembly includes a braking coil, a braking magnet and a braking spring coupled with the braking magnet. As indicated at block 610, a current of a first polarity is applied to the braking coil such that a first magnetic field is produced. The braking magnet is caused to move from a first position to a second position responsive to interaction the first magnetic field. This is indicated at block 612. When the braking magnet is in the first position, the braking spring exerts pressure on the electromagnetic actuator shaft substantially preventing linear movement of the electromagnetic actuator shaft. When the braking magnet is in the second position, the braking spring does not exert pressure on the electromagnetic actuator shaft and the electromagnetic actuator shaft is capable of engaging in linear movement.

In embodiments, and as indicated at block 614, application of the current of the first polarity may be discontinued causing production of the first magnetic field to cease. In some embodiments, when the magnetic field ceases to be produced, the braking magnet may move from the second position to the first position. In other embodiments, responsive to the first magnetic field ceasing to be produced, a current of a second polarity may be applied to the braking coil producing a second magnetic field which, responsive to interaction of the braking magnet therewith, causes the braking magnet to move from the second position to the first position. This is indicated at block 616.

Figure 7:
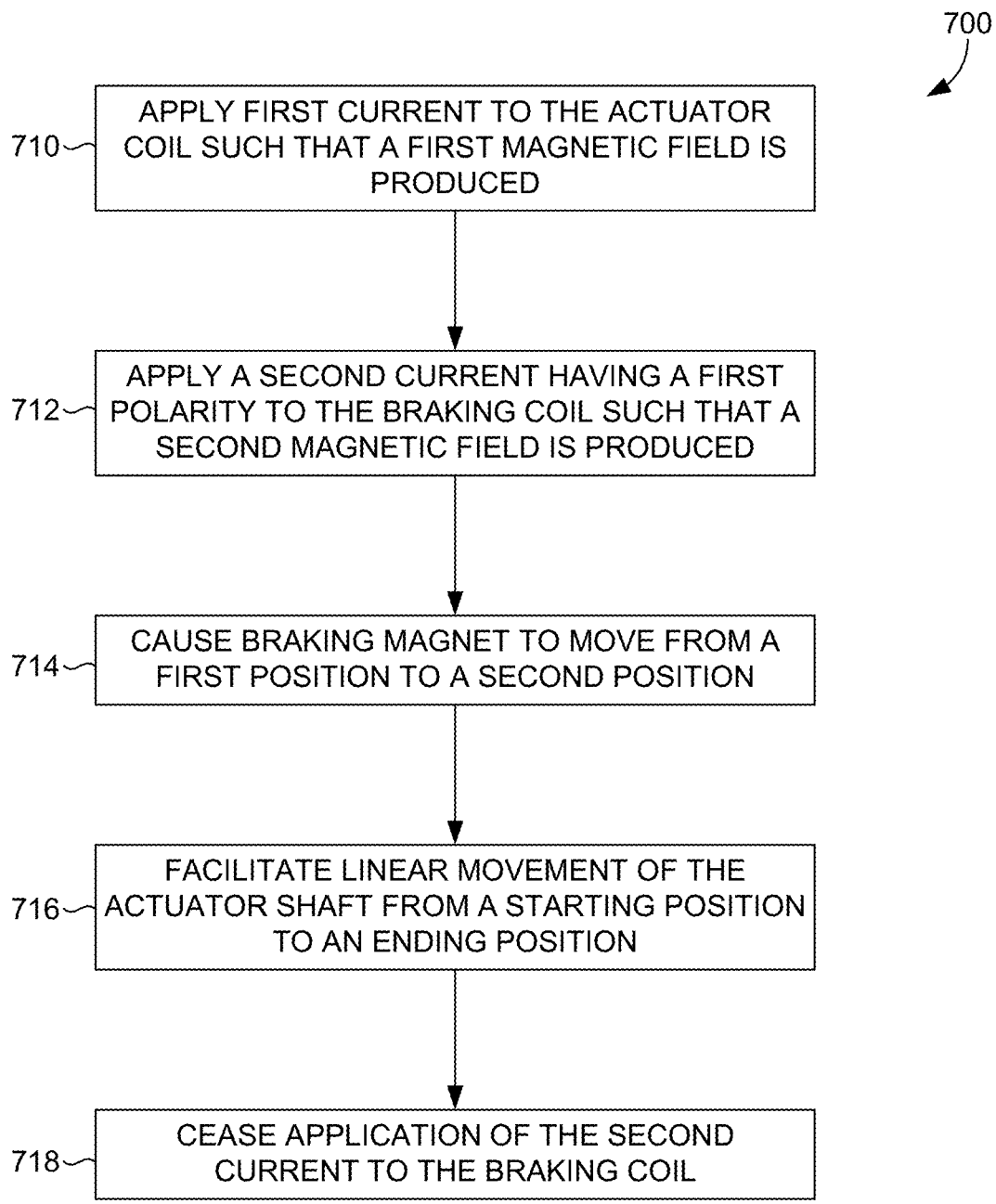
FIG. 7 is a flow diagram illustrating a method for utilizing an electromagnetic braking assembly configured to maintain an electromagnetic actuator shaft of an actuator coil assembly in position, in accordance with embodiments of the present disclosure.

Turning to FIG. 7, a flow diagram is illustrated showing a method 700 for utilizing an electromagnetic braking assembly configured to maintain an electromagnetic actuator shaft of an actuator coil assembly in position, in accordance with embodiments of the present disclosure. As indicated at block 710, a first current is applied to the actuator coil such that a first magnetic field is produced. As indicated at block 712, a second current having a first polarity is applied to the braking coil such that a second magnetic field is produced. Responsive to the braking magnet interacting with the second magnetic field, the braking magnet is caused to move from a first position whereby the braking spring exerts pressure on the electromagnetic actuator shaft substantially preventing linear movement of the electromagnetic actuator shaft to a second position whereby the braking spring does not exert pressure on the electromagnetic actuator shaft permitting the linear movement of the electromagnetic actuator shaft. This is indicated at block 714. As indicated at block 716, linear movement of the electromagnetic actuator shaft is facilitated from a starting position to an ending position via interaction of the electromagnetic actuator shaft with the first magnetic field. As indicated at block 718, application of the second current to the braking coil is ceased such that production of the second magnetic field ceases.

Exemplary Features Having Multiple Dependencies:

As used herein and in connection with the features listed hereinafter, the terminology "any of features" or similar variations of said terminology is intended to be interpreted such that features may be combined in any combination. For example, an exemplary feature 4 may indicate the method/system of any of features 1 through 3, which is intended to be interpreted such that elements of feature 1 and feature 4 may be combined, elements of feature 2 and feature 4 may be combined, elements of feature 3 and feature 4 may be combined, elements of features 2, 3, and 4 may be combined, elements of features 1, 2, 3, and 4 may be combined, and/or other variations. Further, the terminology "any of features" or similar variations of said terminology is intended to include "any one of features" or other variations of such terminology, as indicated by some of the examples provided above.

Feature 1: An electromagnetic braking assembly, comprising: a braking coil configured to receive a first current applied thereto and to produce a first magnetic field during application of the first current; a braking magnet configured to move from a first position to a second position responsive to interaction with the first magnetic field; and a braking spring coupled with the braking magnet such that when the braking magnet is in the first position, the braking spring exerts pressure on an electromagnetic actuator shaft and when the braking magnet is in the second position, the braking spring does not exert pressure on the electromagnetic actuator shaft.

Feature 2: The electromagnetic braking assembly of feature 1, wherein when the braking magnet is in the first position such that the braking spring exerts pressure on the electromagnetic actuator shaft, the electromagnetic actuator shaft is substantially prevented from engaging in linear movement.

Feature 3: The electromagnetic braking assembly of feature 1, wherein when the braking magnet is in the second position such that the braking magnet does not exert pressure on the electromagnetic actuator shaft, the electromagnetic actuator shaft is capable of engaging in linear movement.

Feature 4: The electromagnetic braking assembly of any of features 1 through 3, wherein the braking coil further is configured to receive a second current applied thereto and to produce a second magnetic field during application of the second current, and wherein the braking magnet further is configured to move from the second position to the first position responsive to interaction with the second magnetic field.

Feature 5: A method for utilizing an electromagnetic braking assembly configured to maintain an electromagnetic actuator shaft in position, the electromagnetic braking assembly having a braking coil, a braking magnet and a braking spring coupled with the braking magnet, the method comprising: applying a current of a first polarity to the braking coil such that a first magnetic field is produced which causes the braking magnet to move from a first position to a second position responsive to interaction with the first magnetic field, wherein when the braking magnet is in the first position, the braking spring exerts pressure on the electromagnetic actuator shaft substantially preventing linear movement of the electromagnetic actuator shaft, and wherein when the braking magnet is in the second position, the braking spring does not exert pressure on the electromagnetic actuator shaft and the electromagnetic actuator shaft is capable of engaging in linear movement.

Feature 6: The method of feature 5, further comprising discontinuing application of the current to the braking coil such that production of the first magnetic field ceases causing the braking magnet to move from the second position to the first position.

Feature 7: The method of any of features 5 and 6, further comprising: discontinuing application of the current of the first polarity to the braking coil such that production of the first magnetic field ceases; and applying current of a second polarity to the braking coil such that a second magnetic field is produced which causes the braking magnet to move from the second position to the first position responsive to interaction with the second magnetic field.

Feature 8: An actuator coil assembly, comprising: an electromagnetic actuator shaft configured to engage in linear movement in two opposing directions; an actuator coil concentric with and surrounding the electromagnetic actuator shaft, the actuator coil being configured to receive a first current applied thereto and to produce a first magnetic field during application of the first current; and an electromagnetic braking assembly, the electromagnetic braking assembly including: a braking coil configured to receive a second current applied thereto and to produce a second magnetic field during application of the second current; a braking magnet configured to move from a first position to a second position responsive to interaction with the second magnetic field; and a braking spring coupled with the braking magnet such that when the braking magnet is in the first position, the braking spring exerts pressure on the electromagnetic actuator shaft and when the braking magnet is in the second position, the braking spring does not exert pressure on the electromagnetic actuator shaft.

Feature 9: The actuator coil assembly of feature 8, wherein the electromagnetic actuator shaft includes a first terminus and a second terminus, and wherein the assembly further comprises an optical element coupled with the first terminus.

Feature 10: The actuator coil assembly of feature 9, wherein the optical element is an imaging lens.

Feature 11: The actuator coil assembly of feature 10, wherein the actuator coil assembly is utilized for adjusting the imaging lens.

Feature 12: The actuator coil assembly of any of features 8 through 11, wherein when the braking magnet is in the first position such that the braking spring exerts pressure on the electromagnetic actuator shaft, the electromagnetic actuator shaft is substantially prevented from engaging in the linear movement.

Feature 13: The actuator coil assembly of any of features 8 through 12, wherein when the braking magnet is in the second position such that the braking magnet does not exert pressure on the electromagnetic actuator shaft, the electromagnetic actuator shaft is capable of engaging in the linear movement.

Feature 14: A method for utilizing an electromagnetic braking assembly configured to maintain an electromagnetic actuator shaft of an actuator coil assembly in position, the actuator coil assembly having the electromagnetic actuator shaft and an actuator coil concentric with and surrounding the electromagnetic actuator shaft, and the electromagnetic braking assembly having a braking coil, a braking magnet and a braking spring coupled with the braking magnet, the method comprising: applying a first current to the actuator coil such that a first magnetic field is produced; applying a second current having a first polarity to the braking coil such that a second magnetic field is produced, wherein, responsive to the braking magnet interacting with the second magnetic field, the braking magnet is caused to move from a first position whereby the braking spring exerts pressure on the electromagnetic actuator shaft substantially preventing linear movement of the electromagnetic actuator shaft to a second position whereby the braking spring does not exert pressure on the electromagnetic actuator shaft permitting the linear movement of the electromagnetic actuator shaft; facilitating the linear movement of the electromagnetic actuator shaft from a starting position to an ending position via interaction of the electromagnetic actuator shaft with the first magnetic field; and ceasing application of the second current to the braking coil such that production of the second magnetic field ceases.

Feature 15: The method of feature 14, wherein responsive to production of the second magnetic field ceasing, the braking magnet is caused to move from the second position to the first position whereby the braking spring exerts pressure on the actuator shaft substantially preventing linear movement of the electromagnetic actuator shaft.

Feature 16: The method of any of features 14 and 15, further comprising applying a third current having a second polarity to the braking coil such that a third magnetic field is produced, wherein, responsive to the braking magnet interacting with the third magnetic field, the braking magnet is caused to move from the second position whereby the braking spring does not exert pressure on the electromagnetic actuator shaft permitting the linear movement of the electromagnetic actuator shaft to the first position whereby the braking spring exerts pressure on the electromagnetic actuator shaft substantially preventing the linear movement of the electromagnetic actuator shaft.

Feature 17: The method of any of features 14 through 16, further comprising ceasing to apply the first current to the actuator coil such that production of the first magnetic field is ceased.

Feature 18: The method of any of features 14 through 17, wherein the electromagnetic actuator shaft includes a first terminus and a second terminus, and wherein the assembly further comprises an optical element coupled with the first terminus.

Feature 19: The method of feature 18, wherein the optical element is an imaging lens.

Feature 20: The method of feature 19, further comprising utilizing the electromagnetic braking assembly to adjust the imaging lens in accordance with movement of the electromagnetic actuator shaft.

Feature 21: An electromagnetic braking system for an optical lens barrel assembly, comprising: a braking system chassis having a first cylindrical opening through at least a portion thereof, the cylindrical opening having an interior wall; a cylindrical braking coil positioned on at least a portion of the interior wall of the cylindrical opening such that the cylindrical braking coil has a second cylindrical opening through at least a portion thereof; an actuator shaft having a first end and a second end, the first end being configured to be received within an opening in a housing for the optical lens barrel assembly and to exert pressure on the optical lens barrel assembly, and the second end having a braking spring and a braking magnet coupled therewith; wherein the second end of the actuator shaft is configured for being received within at least a portion of the cylindrical opening through the cylindrical braking coil, wherein responsive to application of a first current to the cylindrical braking coil, a first magnetic field is produced, and wherein responsive to interaction of the braking magnet with the first magnetic field, the actuator shaft is caused to engage in linear movement from a first position whereby the first end exerts pressure on the lens barrel assembly to a second position whereby the first end ceases to exert pressure on the lens barrel assembly.

Feature 22: The electromagnetic braking system of feature 21, further comprising an alignment magnet configured for exerting a force in a direction substantially perpendicular to a direction of the linear movement of the actuator shaft causing at least a portion of the actuator shaft to press against the interior wall of the cylindrical opening of the braking system chassis.

Feature 23: The electromagnetic braking system of any of features 21 and 22, wherein responsive to ceasing the application of the second current to the cylindrical braking coil, production of the first magnetic field ceases causing the actuator shaft to engage in linear movement from the second position to the first position whereby the first end of the actuator shaft exerts pressure on the lens barrel assembly.

Feature 24: The electromagnetic braking system of any of features 21 and 22, wherein responsive to application of a second current to the cylindrical braking coil, a second magnetic field is produced, and wherein responsive to interaction of the braking magnet with the second magnetic field, the actuator shaft is caused to engage in linear movement from the second position to the first position whereby the first end of the actuator shaft exerts pressure on the lens barrel assembly.

Feature 25: The electromagnetic braking system of feature 21, wherein the lens barrel assembly includes a first terminus and a second terminus, and wherein the system further comprises an optical element coupled with the first terminus.

Feature 26: The electromagnetic braking system of feature 25, wherein the optical element is an imaging lens.

Feature 27: The electromagnetic braking system of feature 26, wherein the electromagnetic braking system is configured for adjusting the imaging lens in accordance with movement of the lens barrel assembly.

As can be seen, embodiments hereof are directed to electromagnetic braking assemblies, and methods for using the same, for maintaining electromagnetic actuator shafts in position. Aspects hereof have been described in relation to particular embodiments, which are intended in all respects to be illustrative rather than restrictive. Alternative embodiments will become apparent to those of ordinary skill in the art to which aspects of the present invention pertain without departing from its scope.

While aspects hereof are susceptible to various modifications and alternative constructions, certain illustrated embodiments are shown in the drawings and have been described above in detail. It should be understood, however, that the disclosure is not limited aspects hereof or the specific forms disclosed, but on the contrary, the disclosure includes all modifications, alternative constructions, and equivalents falling within the spirit and scope of aspects of the invention as defined by the claims.

What is claimed is:
1. An actuator coil assembly, comprising:
an electromagnetic actuator shaft configured to engage in linear movement in two opposing directions;
an actuator coil surrounding the electromagnetic actuator shaft, the actuator coil configured to receive a first current applied thereto and to produce a first magnetic field during application of the first current; and
an electromagnetic braking assembly comprising:
a braking coil configured to receive a second current applied thereto and to produce a second magnetic field during application of the second current;
a braking magnet configured to move from a first position to a second position responsive to interaction with the second magnetic field;
a braking shaft that is shiftable into contact with the electromagnetic actuator shaft; and
a braking spring coupled between the braking magnet and the braking shaft,
wherein the braking spring and the braking shaft are positioned between the braking coil and the electromagnetic actuator shaft such that the braking spring and the braking shaft shift linearly along a common axis,
wherein the braking spring biases the braking shaft along the common axis in a linear direction that is perpendicular to the two opposing directions, and
wherein, when the braking magnet is in the first position, the braking spring exerts pressure on the braking shaft which exerts pressure on the electromagnetic actuator shaft in the linear direction, and wherein, when the braking magnet is in the second position, the braking spring and the braking shaft do not exert pressure on the electromagnetic actuator shaft.

2. The actuator coil assembly of claim 1, wherein the electromagnetic actuator shaft includes a first terminus and a second terminus, and wherein the assembly further comprises an optical element coupled with the first terminus.

3. The actuator coil assembly of claim 2, wherein the optical element is an imaging lens.

4. The actuator coil assembly of claim 3, wherein the actuator coil assembly is utilized for adjusting the imaging lens.

5. The actuator coil assembly of claim 1, wherein when the braking magnet is in the first position such that the braking spring exerts pressure on the braking shaft which exerts pressure on the electromagnetic actuator shaft, the electromagnetic actuator shaft is substantially prevented from engaging in the linear movement.

6. The actuator coil assembly of claim 1, wherein when the braking magnet is in the second position such that the braking magnet does not exert pressure on the electromagnetic actuator shaft, the electromagnetic actuator shaft is capable of engaging in the linear movement.

7. The actuator coil assembly of claim 1, wherein the braking shaft comprises:
a first end having a first diameter, and
a second end having a second diameter that is smaller than the first diameter.

8. The actuator coil assembly of claim 7, wherein the second end is configured for engaging with the electromagnetic actuator shaft, and wherein the first end is coupled to the braking magnet.

9. The actuator coil assembly of claim 7, further comprising a rim extending from the braking shaft at a location between the first end of the braking shaft and the second end of the braking shaft, wherein the braking spring abuts against the rim.

10. The actuator coil assembly of claim 1, wherein the braking shaft shifts through a hole in the actuator coil assembly and thereby into contact with the electromagnetic actuator shaft.

11. A method for utilizing an electromagnetic braking assembly configured to maintain an electromagnetic actuator shaft of an actuator coil assembly in position, the actuator coil assembly comprising the electromagnetic actuator shaft and an actuator coil surrounding the electromagnetic actuator shaft, the electromagnetic braking assembly comprising a braking coil, a braking magnet, a braking shaft that is shiftable into contact with the electromagnetic actuator shaft, and a braking spring coupled between the braking magnet and the braking shaft, wherein the braking spring and the braking shaft are positioned between the braking coil and the electromagnetic actuator shaft such that the braking spring and the braking shaft shift linearly along a common axis, and wherein the braking spring biases the braking shaft along the common axis in a first linear direction, the method comprising:
applying a first current to the actuator coil such that a first magnetic field is produced;
applying a second current having a first polarity to the braking coil such that a second magnetic field is produced, wherein, responsive to the braking magnet interacting with the second magnetic field, the braking magnet is caused to move from a first position whereby the braking spring and the braking shaft exert pressure on the electromagnetic actuator shaft thereby substantially preventing linear movement of the electromagnetic actuator shaft along a second linear direction to a second position whereby the braking spring and the braking shaft do not exert pressure on the electromagnetic actuator shaft thereby permitting the linear movement of the electromagnetic actuator shaft along the second linear direction, wherein the first linear direction and the second linear direction are perpendicular to each other;
initiating the linear movement of the electromagnetic actuator shaft from a starting position to an ending position via interaction of the electromagnetic actuator shaft with the first magnetic field; and
ceasing application of the second current to the braking coil such that production of the second magnetic field ceases.

12. The method of claim 11, wherein in response to production of the second magnetic field ceasing, the braking magnet shifts from the second position to the first position whereby the braking spring and the braking shaft exert pressure on the electromagnetic actuator shaft substantially preventing the linear movement of the electromagnetic actuator shaft.

13. The method of claim 11, further comprising applying a third current having a second polarity to the braking coil such that a third magnetic field is produced, wherein, responsive to the braking magnet interacting with the third magnetic field, the braking magnet is caused to move from the second position whereby the braking spring and the braking shaft do not exert pressure on the electromagnetic actuator shaft thereby permitting the linear movement of the electromagnetic actuator shaft to the first position whereby the braking spring and the braking shaft exert pressure on the electromagnetic actuator shaft substantially preventing the linear movement of the electromagnetic actuator shaft.

14. The method of claim 11, further comprising ceasing to apply the first current to the actuator coil such that production of the first magnetic field is ceased.

15. The method of claim 11, wherein the electromagnetic actuator shaft includes a first terminus and a second terminus, and wherein the assembly further comprises an optical element coupled with the first terminus.

16. The method of claim 15, wherein the optical element is an imaging lens.

17. The method of claim 16, further comprising utilizing the electromagnetic braking assembly to adjust the imaging lens in accordance with movement of the electromagnetic actuator shaft.

18. The method of claim 11, wherein the braking shaft comprises:
a first end having a first diameter, and
a second end having a second diameter that is smaller than the first diameter.

19. The method of claim 18, wherein the second end is configured for engaging with the electromagnetic actuator shaft, and wherein the first end is coupled to the braking magnet.

20. The method of claim 18, further comprising a rim extending from the braking shaft at a location between the first end of the braking shaft and the second end of the braking shaft, wherein the braking spring abuts against the rim.

* * * * *